May 7, 1963 C. J. ARMOUR 3,089,080
REGULATED POWER SUPPLY
Filed July 24, 1959
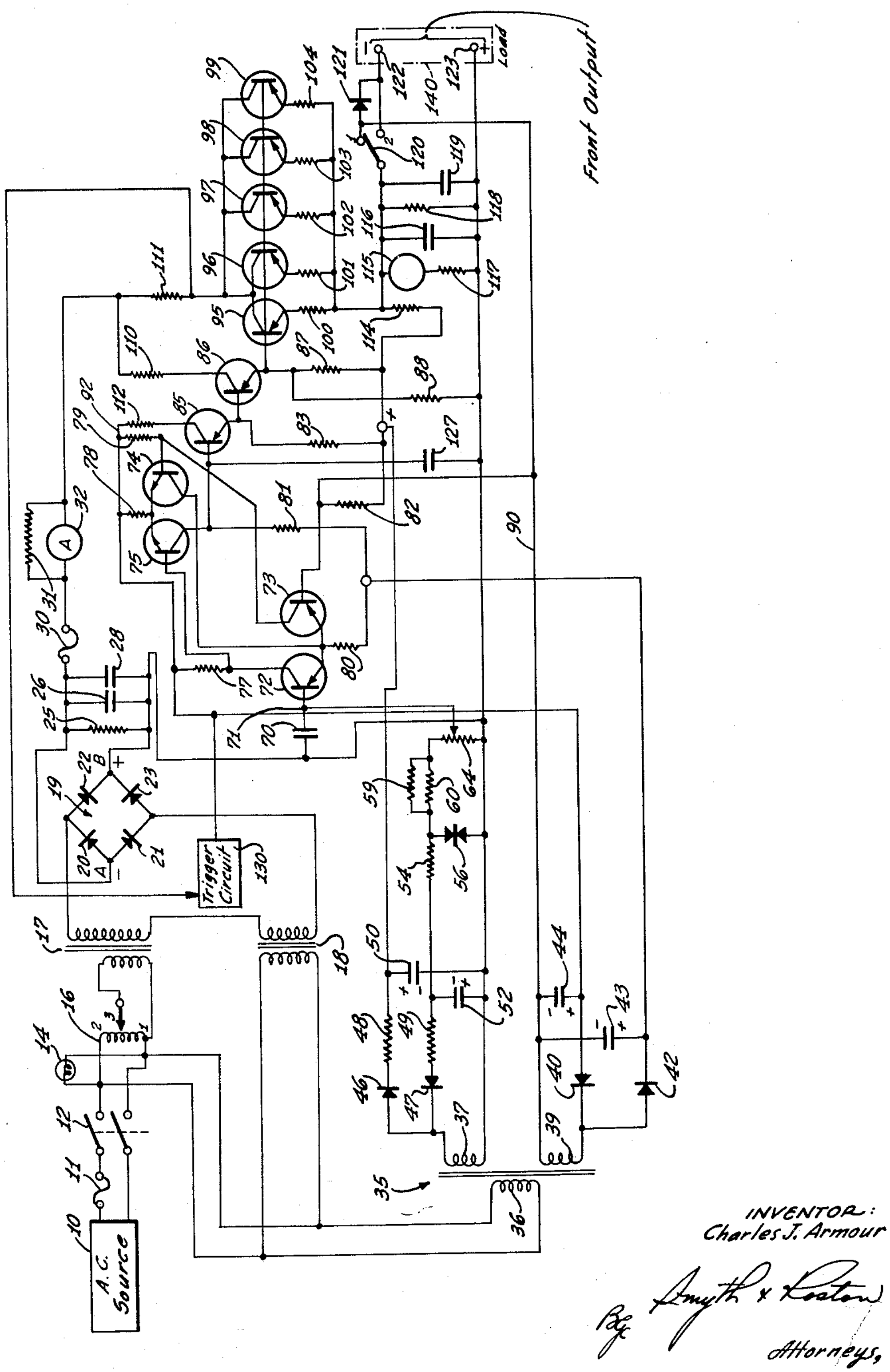
INVENTOR:
Charles J. Armour
By Smyth & Roston
Attorneys, United States Patent Office 3,089,080

Patented May 7, 1963

3,089,080

REGULATED POWER SUPPLY

Charles J. Armour, 14801 McCormick, Sherman Oaks, Calif.

Filed July 24, 1959, Ser. No. 829,258
6 Claims. (Cl. 323—22)

This invention relates to regulated power supplies, and more particularly, to a regulated power supply which maintains an output voltage constant with variations in the supply voltage to the power supply, and with variations of the load coupled to the power supply.

A number of systems have been devised for maintaining the output of a power supply system constant. In a typical system, the variation of output voltage with changes in alternating-current line voltage may be reduced by a factor of 100. There are applications, however, in which regulations of one part in 10,000 are desirable which is an additional improvement by a factor of 100.

Systems have also been devised in which the variation in output voltage with change in load current corresponds to an equivalent internal impedance for the output terminals of the system of one ohm, which may be an improvement by a factor of 100. A very low impedance equivalent internal impedance is important because it makes the output voltage substantially independent of load current, and because it reduces the common coupling and resulting regeneration introduced at low frequencies in multistage audio and video circuits when several stages receive power from the same supply.

In a specific illustrative embodiment of this invention, a regulation improvement by factor of at least 10,000 is achieved for variations due to both line voltage and load current changes. In the specific embodiment, a regulated power supply is provided utilizing semi-conductor means for providing load currents up to 60 amperes with regulated output voltages between 0 and 10 volts. The regulation of one part in 10,000 is achieved for all loads between full and no load.

The semi-conductor means includes a number of transistors connected in a parallel circuit arrangement. The alternating current supply voltage is rectified and filtered and introduced to the parallel arrangement which is serially connected with the load. The conductive conditions of the transistors determine the magnitude of the output potential. The conductive conditions of the transistors are controlled by a dual differential amplifier arrangement which compares the output potential at the load with a reference regulated potential. The reference potential is developed by a Zener diode coupled to the line voltage source.

The various operating potentials for the dual differential amplifier arrangement as well as the reference potential are developed from the supply voltage. Each of the two differential amplifiers in the dual arrangement includes two transistors of similar conductivity type. The output of each differential amplifier is not affected by changes of ambient temperature because the difference between two signals is utilized for the output. The transistors in one differential amplifier are of one conductivity type and the transistors in the other differential amplifier are of the opposite conductivity type.

The output potential and the reference potential are introduced to one of the differential amplifiers. A small change, for example, of 0.1 millivolt, in the magnitude of the output potential due either to a load impedance change or a supply voltage change, changes the conductive conditions of the transistors in both differential amplifiers. The transistors are coupled so that each controls the other three to increase its change of conductivity due to the change of the output potential. Because of this multi-feedback interaction between the four transistors, a change of as little as 0.1 millivolt may result in a change of one volt or more of control potential from the dual differential amplifier arrangement.

The control potential from the dual differential amplifier arrangement is coupled by a transistor emitter follower arrangement to the parallel circuit arrangement which is connected to the load in order to regulate the output potential.

Further features and advantages of this invention will become apparent upon consideration of the drawing wherein:

The single figure is a circuit representation of the regulated power supply of this invention.

Referring to the single FIGURE, a source of alternating current 10 has one terminal connected through a fuse 11 to one arm of a switch 12 and its other terminal connected directly to the other arm of a switch 12. The fuse 11 may have a suitable value such as 23 amperes, and the switch 12 may be a double-pole, single-throw switch which is operated to energize the regulated power supply of this invention. With the switch 12 closed, the A.C. potential from the source 10, which may illustratively be 115 volts, is coupled to a variable auto-transformer 16, to the primary winding of a transformer 18 and to the primary winding 36 of a transformer 35. The variable auto-transformer 16 is manually adjustable to control the magnitude of the output potential of the regulated power supply provided to a load 140 across two output terminals 122 and 123. A lamp 14 is coupled across the variable auto-transformer 16 to provide an indication of the energization of the regulated power supply when the switch 12 is operated.

The signal through the variable auto-transformer 16 is coupled through a transformer 17 to a full wave rectifier 19. The A.C. potential through the switch 12 is also coupled through the transformer 18 which has its secondary winding serially connected with the secondary winding of the transformer 17 across the full wave rectifier 19. The rectifier 19 includes four diodes 20 through 23, inclusive, which are connected in a conventional manner to rectify the A.C. potential across the serially connected secondary windings of the transformers 17 and 18. When the junction between the diodes 20 and 22 is relatively positive, the diodes 22 and 21 are conductive, and when the potential between the junctions of the diodes 21 and 23 is relatively positive, the diodes 23 and 20 are conductive. The junction A between the diodes 20 and 21 is, therefore, the negative output junction of the rectifier 19 and the junction B between the diodes 23 and 22 is the positive output junction of the rectifier 19.

The full wave rectifier 19 is connected to a filter circuit arrangement including the resistor 25 and the capacitors 26 and 28 which are connected across the junctions A and B of the rectifier 19. The resistor 25 may have a suitable value such as 15 ohms and each of the capacitors 26 and 28 may have a suitable value such as 10,000 microfarads. The upper terminals of the capacitors 26 and 28 in the single figure which are connected to junction A, are negative with respect to their lower terminals which are connected to junction B, due to the arrangement of the diodes of the full wave rectifier 19 as described above. Junction B and the relatively positive terminals of the capacitors 25 and 26 are connected directly to the output terminal 123 of the regulated power supply. Though not shown, the junction B and the terminal 123 may be grounded.

The relatively negative terminals of the capacitors 26 and 28 are connected by a fuse 30 to an ammeter 32 which is shunted by a resistor 31. The ammeter 32 is, in turn, connected by a common collector resistor 111 to the collector electrodes of five junction transistors 95 through 99.

The rectified and filtered current is in this manner introduced through the ammeter 32 to the five transistors 95 through 99. Each of the transistors 95 through 99 may be of the type 2N697 power transistor which has a current rating somewhat exceeding 15 amperes.

The five transistors 95 through 99 have their emitter-to-collector paths connected in a parallel circuit arrangement between the common collector resistor 111 and the output terminal 122 from the regulated power supply. The emitter electrodes of the transistors 95 through 99, inclusive, are connected respectively by the emitter resistors 100 through 104 to the movable arm of a switch 120. The common collector resistor may have a suitable value such at 0.2 ohm and each of the emitter resistors 100 through 104 may have a suitable value also of 0.2 ohm. With the switch 120 set at its terminal 1, the resistors 100 through 104 are connected by a diode 121 to the terminal 122, and with the switch 120 set at its terminal 2, the resistors 100 through 104 are directly connected to the terminal 122.

As is hereinafter described, a feedback line 90 is connected to terminal 1 of the switch 120. The potential introduced to the feedback line 90 from terminal 1 reflects the variations of the load 140 when the switch 120 is positioned at its terminal 2. With the switch 120 at its terminal 1, the diode 121 is reversed biased to effectively disconnect the feedback line 90 from the load 140. With the load 140 effectively disconnected the power supply regulates only the input source variations but does not compensate for changes of load impedance. The switch 120, therefore, functions essentially to disconnect the power supply from the load 140 by reverse biasing the diode 120 when it is positioned at its terminal 1. The feedback line 90 still couplies the potential appearing at terminal 1 of the switch 120 but it does not vary with the output load 140. The power supply may readily be calibrated when the switch 120 is at its terminal 1 because of the effective decoupling of the load 140.

With the parallel arrangement consisting of the five power transistors 95 through 99 connected in series between the negative junction A of the full wave rectifier 19 and the output terminal 122, the magnitude of the negative potential at the terminal 122 depends upon the impedance presented by the five transistor parallel circuit arrangement. The base electrodes of the five transistors 100 through 104 are multiplied to the emitter electrode of a transistor 86 which is connected in an emitter follower arrangement. The instantaneous potential at the emitter electrode of the transistor 86 in this manner determines the impedance presented by the transistors 95 through 99 and, therefore, the instantaneous magnitude of the output potential at the terminal 122. The potential at the five base electrodes is a regulated potential which compensates for relatively minor variations of the potential supplied from the source 10 and for major changes in load when the switch 120 is at its terminal 2.

The regulated potential is introduced through the emitter follower arrangement to the five base electrodes of the transistors 95 through 99, inclusive, by circuit means including the transformer 35 which was briefly mentioned above. The primary winding 36 of the transformer 35 receives the A.C. potential from the source 10 through the switch 12. The transformer 35 includes two secondary windings 37 and 39 which are energized by the A.C. potential across the primary winding 36 of the transformer 35. The lower terminal of the winding 37, as viewed in the single figure, is connected directly to the output terminal 123 of the regulated power supply, and the upper terminal of the winding 39 is connected to the anode of the diode 121 so that the potential across these two terminals is the same as that across the terminals 122 and 123 of the regulated power supply.

As indicated above, with the switch 120 at terminal 2 the signal introduced to the feedback line reflects the output load changes of impedance, as well as any changes in output voltage due to changes in the magnitude of the potential from the source 10. Assuming that the switch 120 is at its terminal 2, the relatively negative voltage appearing at the output terminal 122 is introduced through the diode 121 and the feedback line 90 to the base electrode of a PNP junction transistor 73. The base electrode of the transistor 73 is also connected to the upper terminal of the secondary winding 39 of the transformer 35. The potential at the base electrode of the transistor 73 is the same as the potential at the terminal 122 and, therefore, is relatively negative with respect to the potential at the output terminal 123. The lower terminal of the secondary winding 39 is connected to two oppositely poled diodes 40 and 42. The cathode of the diode 40 is connected to the lower terminal of the secondary winding 39 and its anode is connected to a lead 92 so that the lead 92 is essentially at the same potential as the relatively negative potential on the feedback line 90. Variations in the magnitude of the output voltage for any reason including due to changes of load impedance are reflected through the feedback line 90 and the diode 40 to the lead 92.

The anode of the diode 40 is also connected to a capacitor 44 which is, in turn, connected to the feedback line 90. A second capacitor 43 is connected between the feedback line 90 and the cathode of the diode 42. The capacitors 43 and 44 may have a suitable value such as 500 microfarads and are utilized to smooth the fluctuations of the signal provided respectively through the diodes 40 and 42. The cathode of the diode 42 is connected by a common emitter resistor 80, which may have a suitable value such as 20 kilo-ohms, to the emitter electrode of the transistor 73.

The emitter resistor 80 and the transistor 73 are part of a differential amplifier arrangement including also a PNP junction transistor 72. The emitter electrodes of both of the transistors 72 and 73 are connected to the common emitter resistor 80, and the collector electrodes of the transistors 72 and 73 are respectively connected by the resistors 77 and 79 to the lead 92 which was briefly described above. The resistors 77 and 79 may have suitable values such as 56 kilo-ohms each. In this manner, the collector electrodes of the transistors 72 and 73 receive the regulated output potential whereas the emitter electrodes receive an unregulated input potential through the transformer 35. The unregulated potential is coupled through the transformer 35 from the alternating current source 10.

A change in the magnitude of the A.C. potential from the source 10 is, therefore, reflected by a change in the emitter potential of the transistors 72 and 73. The potential at the base electrode of the transistor 73 also changes with the changes in the magnitude of the input signal due to its connection by a base resistor 82 to the capacitor 50 of a filtering and rectifying arrangement connected to the secondary winding 37 of the transformer 35. The base resistor 82 and the filter capacitor 50 may have suitable values such as respectively 47 kilo-ohms and 80 microfarads.

The voltage coupled to the secondary winding 37 from the source 10 is provided through a diode 46 to a filtering arrangement including a resistor 48 and the capacitor 50. The resistor 48 may have a suitable value such as 470 ohms. The magnitude of the potential at the base electrode as well as at the emitter electrode of the transistor 73 varies, therefore, with the input signal from the source 10. For this reason, the conductivity of the transistor 73 does not change due to the signal coupled across the transformer 35.

The biasing potential across the emitter-to-base junction of the transistor 73 is determined, therefore, by the output potential at terminal 1 of the switch 120 because the variation of both emitter and base potentials with the input potential across the transformer 35 is similar. Moreover, he collector bias of the transistor 73 varies with the variation of the output potential due to the connection of the lead 92 through the secondary winding 39 and diode 40 to the line 90 so that the conduction through the transistor 73 is determined solely by the output voltage introduced to its base electrode.

The feedback output voltage at the base electrode of the transistor 73 is compared with a reference voltage introduced to the base electrode of the transistor 72. As indicated above, the two transistors 72 and 73 form a differential amplifier arrangement. The base potential of the transistor 72 is provided from the secondary winding 37 through a diode 47 and a filtering arrangement consisting of a resistor 49 and a capacitor 52. The resistor 49 and the capacitor 52 may have suitable values similar to the values for the resistor 49 and capacitor 50 forming the other filter arrangement connected to the secondary winding 37.

The negative filtered potential aross the capacitor 52 is introduced through a resistor 54 across a Zener diode 56. The resistor 54 may have a suitable value such as 82 kilo-ohms and the Zener diode may have a breakdown potential somewhat greater than the maximum desired regulated output voltage from the power supply. Illustratively for a maximum regulated voltage of 10 volts, the Zener potential may be slightly less than 11 volts. The Zener diode 56 provides a negative regulated voltage across its terminal because it remains constant as long as the voltage across the filter capacitor 52 exceeds the Zener voltage. Even through the potential across the capacitor 52 varies, the potential across the diode 56 remains constant.

The Zener diode 56 is connected to a voltage divider arrangement consisting of two parallel resistors 59 and 60 which are serially connected with a potentiometer 64. The resistors 59 and 60 may have suitable values such as 68 kilo-ohms and one kilo-ohm respectively, and the resistance across the end terminals of the potentiometer 64 may be 10 kilo-ohms. The potentiometer 64 is mechanically coupled or ganged to the variable auto transformer 16 described above. The variable auto transformer 16 and the potentiometer 64 are adjusted synchronously to change the magnitude of the regulated output potential provided to the load 140. The adjustable contact of the potentiometer 64 is connected to the base electrode of the transistor 72 so that a regulated potential having a magnitude determined by the setting of the potentiometer 64 is provided thereat.

As described above, the potential at the base electrode, also designated as point 71, is utilized as a reference for output regulated potential. The output voltage appearing at the output terminal 122 is introduced through the feedback line 90 to the base electrode of the transistor 73. The transistors 72 and 73 are normally both conductive as their emitter-to-base junctions are forward biased. The emitter electrodes are biased by the relatively positive potential coupled through the diode 42 from the transformer 35. The base electrode of the transistor 73 is at a relatively negative potential due to its connection through the feedback line 90, and the base electrode of the transistor 72 is also at a relatively negative potential due to its connection to the Zener diode 56. The conduction through the two transistors 72 and 73 is exactly the same when the output potential is exactly the same as the potential introduced to point 71 at the base elctrode of the transistor 72.

If either the impedance of the load 140 or the magnitude of the input signal changes, the conductive conditions of the transistors 72 and 73 which form the differential amplifier, change. Assume first that the load 140 or the input potential changes so that the potential at the feedback line 90 becomes more negative. This condition would occur if the impedance presented by the load 140 decreases or if the magnitude of the input potential increases. With the potential at the feedback line 90 becoming more negative, the base potential of the transistor 73 becomes more negative to increase the conduction through its emitter-to-collector path. The increase in conduction through the transistor 73 provides for a greater potential difference across the common emitter resistor 80 so that the common emitter potential becomes more negative. The emitter-to-base bias potential of the transistor 72 accordingly decreases to reduce the conduction through the emitter-to-collector path of the transistor 72. Conversely, if the feedback potential on the line 90 becomes more positive, the transistor 73 becomes less conductive to cause the transistor 72 to become more conductive.

As indicated above, if the magnitude of the input signal from the alternating current source 10 increases, the potential at the output terminal 122 becomes more negative to increase the conductivity of the transistor 73 so that a similar effect is achieved for variations of the input signal magnitude as for variations of the output load impedance.

The differential amplifier which includes the two transistors 72 and 73 is part of a dual differential amplifier arrangement consisting of two somewhat similar differential amplifiers. The second differential amplifier includes two NPN junction transistors 74 and 75 which are connected in a similar arrangement as the two transistors 72 and 73. The transistors 74 and 75 are of conductivity type opposite to the conductivity type of the transistors 72 and 73. All four transistors 72 through 75 are conductive because the emitter-to-base junctions of the transistors 72 and 73 are forward biased, and the base-to-emitter junctions of the transistors 74 and 75 are forward biased.

The conductive conditions of the four transistors 72 through 75 are interrelated in that each affects the other to provide for a large corresponding change of potential at the collector electrode of the transistor 75 for a small change of feedback output potential to the base electrode of the transistor 73.

The collector electrodes of the transistors 72 and 73 are directly connected respectively to the base electrodes of the two transistors 75 and 74 which form the second differential amplifier. The emitter electrodes of the transistors 75 and 74 are connected by a common emitter resistor 78, which may have a suitable value such as 2.7 kilo-ohms, to the lead 92. The collector electrode of the transistor 74 is directly connected to the emitter electrodes of the transistors 72 and 73 so that the common emitter resistor 80 also functions as a collector resistor for the transistor 74. The collector electrode of the transistor 75 is connected by a collector resistor 81, which may have a suitable value such as 160 kilo-ohms, to the diode 42 described above. As long as the potential at the reference point 71 is the same as the potential on the feedback line 90, the potentials at the collector electrodes of the two transistors 72 and 73 are identical so that the conduction through the two transistors 74 and 75 is also identical.

The interaction between the four transistors 72 through 75 may be illustrated by assuming as above that the magnitude of the output potential increases somewhat becoming more negative so that the change of potential at the base electrode of the transistor 73 increases the conduction through the transistor 73. The current through the common emitter resistor 80, therefore, increases so that the common emitter potential becomes more negative to decrease the conduction through the transistor 72. With the conduction through the transistor 72 decreased somewhat, its collector potential becomes less negative. The potential on the collector of the transistor 73 also becomes less negative because of the increased voltage drop across the resistance 79 as a result of the increased flow of current through the transistor 73.

Since the base of the transistor 74 is connected to the collector of the transistor 73 the positive rise in potential on the collector of the transistor 73 causes the current through the transistor 74 to increase. The increase in conduction through the transistor 74 causes its collector potential to become more negative and its emitter potential to become more positive. Both effects tend to decrease the conduction through the transistor 75. The increase of current through the transistor 74 causes the potential at the emitter electrodes of the transistors 74 and 75 to become more positive to decrease the conduction through the transistor 75. The increase of current through the transistor 74 also produces an increased potential drop across the resistor 80 and on the emitter of the transistor 72. This in turn produces a decrease in the flow of current through the transistor 72 such that the base potential of the transistor 75 becomes more negative and the flow of current through the transistor tends to decrease even further.

The conductivity of each transistor is in this manner affected by all three of the other transistors. To further illustrate the interaction, consider the effect on the transistor 72 due to the conductivity change of each of the three transistors 73, 74 and 75:

(1) As the transistor 73 becomes more conductive, it causes the emitter potential of the transistor 72 to become negative;

(2) As the transistor 74 becomes more conductive, it also causes the emitter potential of the transistor 72 to become more negative and further causes the transistor 75 to become less conductive;

(3) As the transistor 75 becomes less conductive, it tends to produce a decreased voltage drop across the resistance 78 so that the emitter potential of the transistor 74 becomes more negative and the current through the transistor 74 to increase so as to make the potential on the emitter of the transistor 72 more negative.

The change of current through the common emitter resistor 80 due to the transistor 74 is much larger than the change due to either the transistor 73 or 72. Actually, therefore, each of the four transistors 72, 73, 74 and 75 affects the conduction through the other three since each is part of a two-transistor differential amplifier and is coupled in a feedback relationship to the other dfferential amplifier. The effects are cumulative because each of the transistors 73 through 75 affects the conductivity of the transistor 72, and the transistor 72, in turn, also affects the conductive conditions of all three transistors 73 through 75.

The considerable increase of current through the transistor 72 due to a relatively small change of potential on the feedback line 90 increases considerably the conduction of the transistor 75 which provides the regulated voltage from the dual differential amplifier arrangement. The collector potential of the transistor 75 varies up to 1.5 volts responsive to changes of output potential of less than one millivolt on the output line 90. The circuit parameters of the various components in the dual differential amplifier arrangement are selected so that the transistors remain in their linear operating regions.

The collector electrode of the transistor 75 is connected to two cascaded emitter follower arrangements; the first including a PNP junction transistor 85, and the second including the PNP junction transistor 86 which was briefly described above. The two emitter follower arrangements function as impedance isolating devices for the dual differential amplifier arrangement. The collector electrode of the transistor 85 is connected by a resistor 112, having a suitable value such as 220 ohms, to the lead 92. The base electrode of the transistor 85 is also coupled by a capacitor 127 to the output terminal 123. The capacitor 127 may have a suitable value such as 1 microfarad.

The emitter electrode of the transistor 85, which is connected to the base electrode of the transistor 86, is also connected by a resistor 83 to the filter arrangement including the capacitor 50 described above. The resistor 83 may have a suitable value such as 39 kilo-ohms. The collector electrode of the transistor 86 is connected by the resistor 110 to the ammeter 32 described above, and its emitter electrode is connected by a resistor 87 to the capacitor 50 and by a resistor 88 to the output terminal 123. The resistors 110, 87 and 88 may respectively have suitable values such as 3.0 ohms, 15 kilo-ohms and 1 kilo-ohm, and together effectively form a voltage divider arrangement for determining the potential at the emitter electrode of the transistor 86. As described above, the emitter electrode of the transistor 86 is connected to the base electrodes of the five power transistors 95 through 99.

As also described above, when the magnitude of the output potential becomes more negative, the transistors 73 and 74 become more conductive and the transistors 72 and 75 become less conductive. The potential at the collector electrode of the transistor 75, therefore, becomes less negative to decrease the conduction through the emitter follower transistors 85 and 86. There is no phase reversal through the emitter follower arrangements because the emitter electrodes become less negative with decreased conductivity of the respective transistors 85 and 86. In this manner, when the output potential becomes more negative, the regulator voltage to the base electrodes of the transistors 95 through 99 become less negative.

When the multiplied base electrodes become less negative, the impedance presented by each of the transistors 95 through 99 is increased to cause the magnitude of the output potential to decrease or become less negative. In this manner, a small change of the magnitude of the output potential is automatically compensated for by adjusting the conductivity of the transistors 95 through 99. For variations of the load 140 from full load to no load, the regulation is accurate to 0.0001 or one part in 10,000.

In each of the two differential amplifiers, the two transistors are of the same type so that they vary together with changes in ambient temperature. Since it is actually the difference between the gains of the two transistors which determine the regulation, the dual differential amplifier arrangement automatically compensates for temperature changes to maintain the regulation accuracy.

The reference potential at the point 71 at the base electrode of the transistor 72 determines the regulated magnitude of the output potential. As described above, the potential at point 71 is adjusted by the potentiometer 64 at the same time the variable auto transformer 16 adjusts the output potential. If the potential at point 71 is made more negative, it increases the conduction through the transistor 72 to change the output voltage in a direction to increase the conduction through the transistor 73 in order to balance the conduction through the transistor 72.

The signal introduced to the output terminal 122 under control of the five transistor parallel arrangement is filtered by a parallel circuit arrangement including a capacitor 116, a resistor 118 and a capacitor 119 so that any ripples are removed. The capacitors 116 and 119 and the resistor 118 may have suitable values respectively such as 100 microfarads, 1 microfarad and 50 ohms. A voltmeter 115 which is serially connected with resistor 117 is also coupled across the output terminals. The resistor 117 may have a suitable value such as 10 kilo-ohms.

If the impedance of the load 140 decreases toward zero ohms, the current through the five transistors 95 through 99 may exceed their ratings. The five transistors 95 through 99 may have a combined rating of 75 amperes. Actually, for currents over 60 amperes, the transistors 95 through 99 present substantially minimum impedances to the current so that any developed voltage is across the common collector resistor 111 and the individual emitter resistors 100 through 104. The power consumption of the transistors 95 through 99 does not, therefore, increase materially for currents exceeding 60 amperes. As a further safety feature, however, a threshold trigger circuit 130 may be operated if the current through the parallel five transistor arrangement exceeds 60 amperes. When the current exceeds 60 amperes, their collector potentials become sufficiently less negative or more positive to trigger the circuit 130.

The collector electrodes of the five transistors 95 through 99 are connected to the input of the trigger circuit 130, which may be a flip-flop. The trigger circuit 130 is a threshold responsive circuit which is essentially nonfunctional until its input potential exceeds the threshold value. When the circuit 130 is triggered, it decreases the magnitude of the potential on the lead 92, making it less negative to reduce the conductivity of the transistor 75. The regulated voltage to the base electrodes of the transistors 95 through 99 changes accordingly to reduce the conductivity of the transistors 95 through 99. When the potential at the collector electrodes of the transistors 95 through 99 indicates that less than 60 amperes are flowing, the circuit 130 returns to normal. Actually, of course, the fuse 30 is set to blow when a current having an amplitude considerably less than 60 amperes flows for more than an instantaneous period of time. For example, the current for blowing the fuse 30 may be 10 amperes.

As described above, the potentials on the output line 90, on the line 92 and on the terminal common to the resistances 80 and 81 vary in a similar manner as the potential on the primary winding 36 varies. This causes the potential between the line 92 and the terminal common to the resistances 80 and 81 to vary only in accordance with variations on the output line 90 and not in accordance with variations in the potential from the source 10. Because of this, the differential amplifier arrangement including the transistors 72, 73, 74 and 75 experience only slight changes in current to provide the action necessary to regulate the potential on the line 90. This change in current is less than 1 milliampere, especially in view of the sensitive regulating action provided by the transistors 72, 73, 74 and 75 as a result of the feedback arrangement between the different transistors. In this way, all of the components including the transistors 72, 73, 74 and 75 can be operated at their optimum characteristics and do not have excessive strains imposed on them.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A regulated power supply for a variable impedance load including a source of unregulated potential, semiconductor means coupled to said load and to said source of unregulated potential for controlling the magnitude of the potential across the load; a source of reference potential; means including a differential amplifier arrangement coupled to the load and to said reference potential source for comparing the potential across the load with the reference potential and for developing a control output potential in accordance therewith, said differential amplifier arrangement including a first differential amplifier for receiving the potential across the load and the reference potential and for providing two different control potentials in accordance with the difference therebetween, a second differential amplifier coupled to said first differential amplifier for receiving the two control potentials and for providing two different control output potentials in accordance with the potential difference between the two control potentials, and feedback means connected to introduce one of the two different control output potentials from said second differential amplifier to said first differential amplifier at a point to effectively increase the potential difference between the two control potentials; and means coupled to said second differential amplifier for introducing the other of said control output potentials to said semiconductor means to control the magnitude of the potential across the load.

2. A differential amplifier arrangement for detecting small variations in the difference of two input potentials, including, a first differential amplifier having a first and a second transistor of the same conductivity type, each of said first and said second transistors including base, emitter and collector electrodes, means for introducing one of the two input potentials to the base electrode of said one transistor and the other of the two input potentials to the base electrode of said second transistor, a common emitter biasing circuit coupled to said emitter electrodes of said first and said second transistors; a second differential amplifier having a third and a fourth transistor each being of a conductivity type opposite to the conductivity type of said first and said second transistors, means connecting said collector electrodes of said first and said second transistors respectively to said base electrodes of said third and said fourth transistors, a common biasing circuit coupled to the emitter electrodes of said third and said fourth transistors, an output connection coupled to the collector electrode of said third transistor, and a feedback connection coupled from said collector electrode of said fourth transistor to said emitter electrodes of said first and said second transistors.

3. A regulated power source for supplying a constant direct potential to a variable load, including, a source of unregulated direct potential, at least one transistor having an emitter-to-collector path coupled between the source of unregulated potential and the variable load, and a base electrode, a transistor emitter follower coupled to said base electrode of said transistor for controlling the impedance presented by said emitter-to-collector path of said transistor, a pair of differential amplifiers for developing a regulated control potential, means connecting one of said differential amplifiers to said transistor emitter follower and the other of said differential emplifiers to the load, means coupled to said source of unregulated direct potential for developing a constant reference potential having a magnitude smaller than the minimum magnitude of the unregulated direct potential and for introducing the constant reference potential to said other of said differential amplifiers, means coupling said pair of differential amplifiers in a feedback arrangement so that the operation of each affects the other, and threshold responsive means coupled to said emitter-to-collector path of said transistor and to said one differential amplifier for reducing the magnitude of the developed control potential whereby the impedance presented by said emitter-to-collector path is increased.

4. A regulated power supply for a variable impedance load including a source of unregulated potential, semiconductor means coupled to said load and to said source of unregulated potential for controlling the magnitude of the potential across the load, a source of reference potential, means including a differential amplifier arrangement coupled to the load and to said reference potential source for comparing the potential across the load with the reference potential and for developing a control output potential in accordance therewith, means coupled to said differential amplifier arrangement for introducing the control output potential to said semiconductor means to control the magnitude of the potential across the load, and threshold responsive means coupled to said semiconductor means and responsive to a current exceeding a predetermined threshold value through said semiconductor means for introducing an inhibiting potential to said differential amplifier arrangement to change the magnitude of the control output potential in a direction to provide for an effective increase of impedance of said semiconductor means.

5. A differential amplifier arrangement for detecting small variations in the difference to two input potentials, including, a first differential amplifier for receiving the two input potentials and for providing two different control potentials in accordance with the difference therebetween, said first differential amplifier including a pair of transistors of the same conductivity type, each of which receives one of the two input potentials and provides one of the different control potentials, a second differential amplifier coupled to said first differential amplifier for receiving the two control potentials and for providing two different control output potentials in accordance with the potential difference between the two control potentials, said second differential amplifier including a pair of transistors each of a conductivity type opposite to that of said transistors in said first differential amplifier, and feedback means coupled from said transistors in said second differential amplifier to said transistors in said first differential amplifier for introducing one of the two different control output potentials to said first differential amplifier whereby the potential difference between the two control potentials is increased.

6. A regulated power supply for a variable impedance load including a source of unregulated potential, semiconductor means coupled to said load and to said source of unregulated potential for controlling the magnitude of the potential across the load, a source of reference potential, means including a differential amplifier arrangement coupled to the load and to said reference potential source for comparing the potential across the load with the reference potential and for developing a control output potential in accordance therewith, developing means coupled to said source of unregulated potential for developing operational potentials for said differential amplifier arrangement and for introducing the developed potentials to said differential amplifier arrangement, means coupled to the load and to said developing means for controlling said developing means to vary the magnitude of the operational potentials in accordance with variations of the potential across the load, means coupled to said differential amplifier arrangement for introducing the control output potential to said semiconductor means to control the magnitude of the potential across the load, and threshold responsive means coupled to said semiconductor means and responsive to a current exceeding a predetermined threshold value through said semiconductor means for introducing an inhibiting potential to said differential amplifier arrangement to change the magnitude of the control output potential in a direction to provide for an effective increase of impedance of said semiconductor means.

References Cited in the file of this patent

UNITED STATES PATENTS

| | | |
|---|---|---|
| 2,443,534 | Eglin | June 15, 1948 |
| 2,545,507 | Williams | Mar. 20, 1951 |
| 2,556,129 | Wellons | June 5, 1951 |
| 2,609,527 | Raburn et al. | Sept. 2, 1952 |
| 2,843,671 | Wilkins et al. | July 15, 1958 |
| 2,915,693 | Harrison | Dec. 1, 1959 |